Oct. 27, 1959 W. F. BILLINGSLEY 2,910,104
CRACK RESISTANT AND TRACTION BOOSTING
DEVICE FOR PNEUMATIC TIRE TREADS
Filed Nov. 21, 1957 2 Sheets-Sheet 1

INVENTOR.
WILLIAM F. BILLINGSLEY
BY
C. E. Tripp
ATTY.

Oct. 27, 1959 W. F. BILLINGSLEY 2,910,104
CRACK RESISTANT AND TRACTION BOOSTING
DEVICE FOR PNEUMATIC TIRE TREADS
Filed Nov. 21, 1957 2 Sheets-Sheet 2

INVENTOR.
WILLIAM F. BILLINGSLEY
BY
C. E. Tripp
ATTY.

2,910,104

CRACK RESISTANT AND TRACTION BOOSTING DEVICE FOR PNEUMATIC TIRE TREADS

William F. Billingsley, Silver Lake, Ohio, assignor to The B. F. Goodrich Company, New York, N.Y., a corporation of New York Application November 21, 1957, Serial No. 697,852

7 Claims. (Cl. 152—211)

Pneumatic tire treads having circumferential ribs with intervening grooves have been widely used for some time. The carcass of the tires is formed of strain-resisting elements such as cords of cotton, rayon and nylon as well as wire filaments. Modern truck, passenger car and other tires are subjected to operating conditions that cause considerable flexing and straining of the tread. Difficulty has been encountered with the development of growth and cracking at the base of the circumferential grooves between the ribs. Such cracking problems may be more severe with some types of carcass material than with others, the relatively high stretch fabrics some times employed aggravating the condition.

Crack resistant elements of this invention retard and restrain the development of cracks in the grooves which, in addition to improving the tire, gives greater freedom to the tire designer to select various combinations of carcass elements and tread combinations. The crack-resisting elements of the invention are in the form of continuous lengths of wire having generally radial loops that are staggered around the tire on each side of the grooves and are connected by elements that bridge the base of the grooves. These wire elements, made preferably of steel or other high tensile strength selected material, restrict working of the tread compound at the base of the grooves and hence retard or prevent crack growth. In addition to this, however, the radial loops form traction boosting elements as the tire wears.

Another advantage of the invention is that the wire elements are readily placed and retained in the mold during cure and will not be displaced by flow of tread rubber while it is conforming to the tread pattern of the mold.

The manner in which these and other advantages may be obtained will be apparent from the following detailed description and the accompanying drawings.

Figure 1:
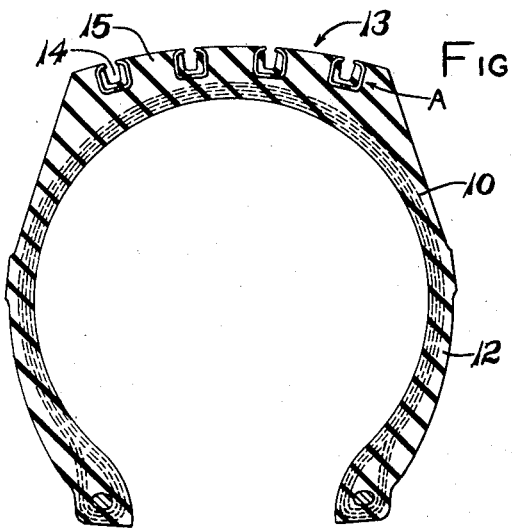
Fig. 1 is a section of a tire embodying the elements of the invention.

Referring to Fig. 1, the tire shown comprises the conventional carcass 10 of strain-resisting elements which has bias laid plies of rubberized cord fabric formed in the usual manner. The tire has a rubber sidewall 12 and a contoured tread 13 which has grooves 14 forming the running ribs 15, which grooves are completely or partially circumferential and may be straight, zigzag or sinuous. Combined crack-resisting and traction elements A are shown embodied in the tread.

Figure 2:
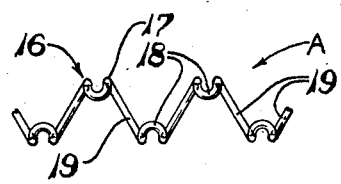
Fig. 2 is a plan view length of a wire element.
Figure 2A:
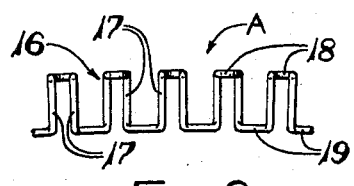
Fig. 2a is a side view thereof.
Figure 3:
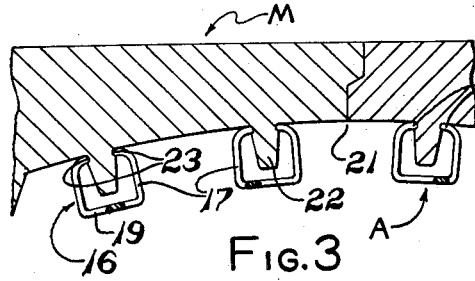
Fig. 3 shows the elements in the mold with the tire omitted for clarity.
Figure 4:
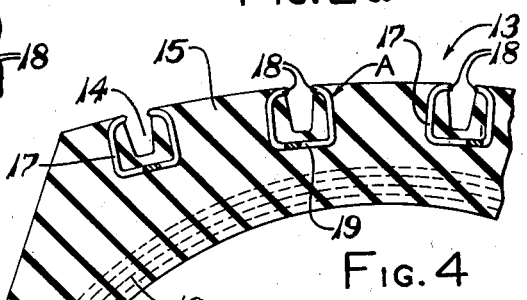
Fig. 4 is a view larger than that of Fig. 1 showing a section of the tread of the completed tire.
Figure 5:
Fig. 5 is a top view of the modified wire element.
Figure 6:
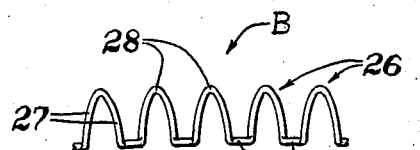
Fig. 6 is a side view thereof.
Figure 7:
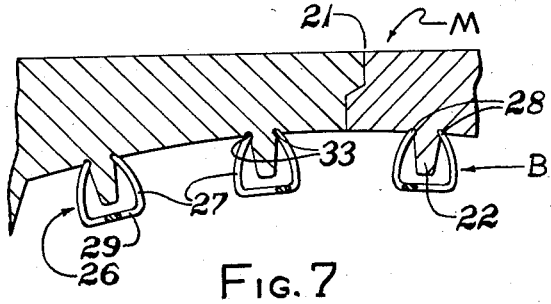
Fig. 7 shows the element in a partial mold.
Figure 8:
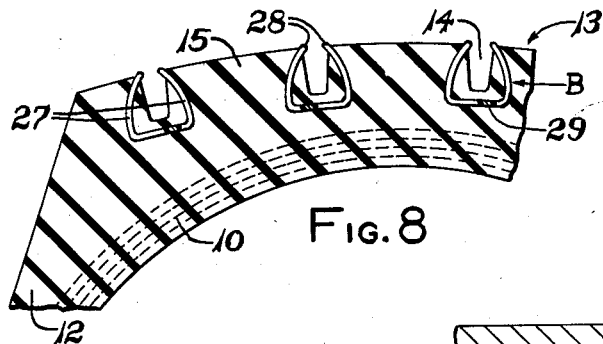
Fig. 8 shows part of the tire tread embodying the element.
Figure 9:
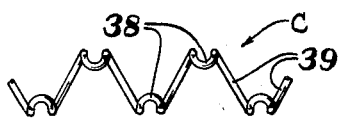
Figs. 9 and 10 are top and side views of another form of the element.
Figure 10:
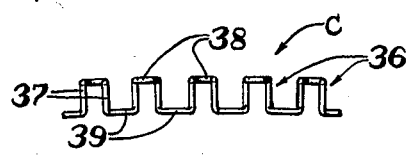

Referring to Figs. 2-4, the wire elements are shown on a larger scale and it can be seen that the wire is of generally sinuous form with staggered loops disposed alternately along its length. The loops are indicated generally at 16 and have generally radial legs 17 merging with curved ends or apices 18 which are bent so as to have an axial extent, the apices on opposite sides of the wire elements being pointed toward one another in an axial direction. The loops on opposite sides of the wire elements are connected by connecting portions or bridge members 19.

Fig. 3 shows a section with the wire elements snapped into the mold. The mold M is shown having a parting line 21 at its mid plane in accordance with the usual practice. Ribs 22 extend inwardly from the periphery of the mold which form a groove in the finished tire between the tire ribs. These mold ribs are notched at 23 to receive the apices 18 of the wire elements. The legs 17 and connecting portions 19 are spaced from and adjacent to the walls of the grooves. Due to the aforesaid construction, the wire elements are firmly gripped and centered in the mold and will not be displaced during cure. Fig. 4 shows a tire cured in the mold assembly of Fig. 3. The multiple bridge or connecting portions 19 and the legs 17 of the loops reinforce the tire at the groove portions during running and retard or prevent the growth of cracks at the base of the grooves. In addition, the apices 18 of the elements are soon presented to the road surface to serve as traction boosting elements and traction boosting action continues even when the tire tread is worn enough to separate the connection between the legs 17 of the loops because the ends of the legs 17 are presented to the road. The reinforcing action at the base of the grooves will remain after such wear occurs.

The form of the invention shown in Figs. 5–8 is similar to that just described. The wire elements B have loops 26 staggered as before with generally radial legs 27, apices 28 and connecting portions 29 under the grooves of the tire. These apices snap into grooves or notches 33 in the mold. This form differs from the previous one in that the apices 28 are not bent as much relative to the legs so that they have a greater radial extent than do the apices of the previous form. Also, notches 33 are disposed so that the apices 28 are exposed in the cured tire. This results in an earlier introduction of a claw-like traction action from the end portions of the legs 27 than is obtained in the previous form.

Figure 11:
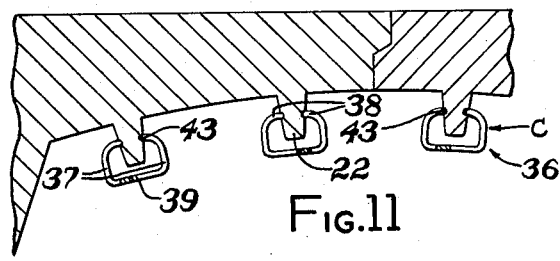
Fig. 11 shows it in the tire mold.
Figure 12:
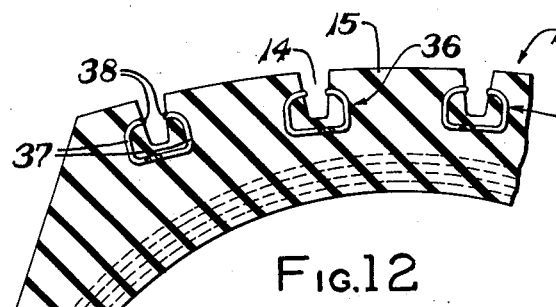
Fig. 12 shows it in the tire mold.

The form shown in Figs. 9–12 is of the same general construction as the wire elements previously described but the radial extent of the wire elements is less than that of the previous ones. The wire length C has staggered loops indicated generally at 36, legs 37 and apices 38 extending towards one another. The loops are connected by connecting or bridge portions 39 disposed radially inwardly of the base of the grooves in the tire tread. As seen in Fig. 11, the notches 43 in the ribs of the mold are disposed a predetermined distance radially inwardly of the base of the mold ribs 22. The purpose of this arrangement is so that a single size of wire element can be selected which may be used over a range of sizes of molds, particularly a range of mold rib depths. Thus, the radial dimension of the wire elements will be such that the grooves 38 will be near the base of the mold ribs 22 for the smallest depth tread pattern, whereas the grooves 38 will be displaced radially inwardly for the larger size tires as in Figs. 11 and 12. This avoids interference with the carcass plies when the selected wire elements are used for the small tires.

In this form of the invention the traction boosting action does not take place until the tread has worn to expose the apices of the loops, the occurrence of which will depend upon relative dimensions selected. This is not a serious disadvantage because the need for traction boosting is not as pressing when the tread is new as it is after a certain degree of wear has occurred.

Figure 13:
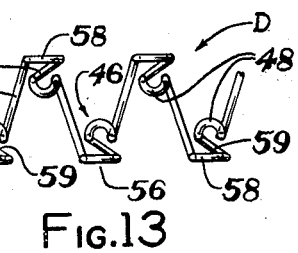
Figs. 13 and 14 are top and side views of a fourth form of wire.
Figure 14:
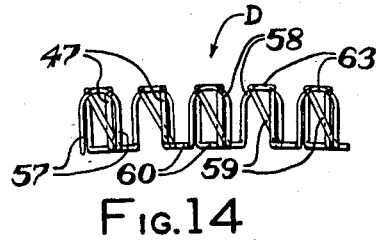
Figure 15:
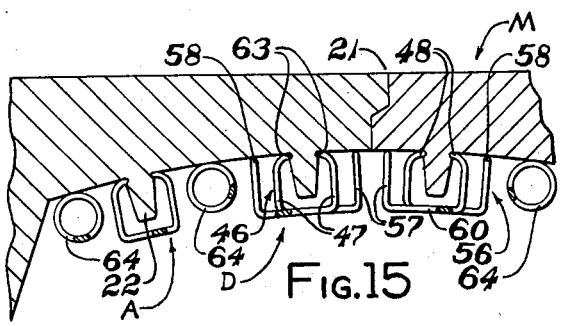
Fig. 15 shows the parts in the mold.

The form of the invention shown in Figs. 13–16 has a wire element that is somewhat more complex than those previously described which element has additional advantages. Here the generally radial loops are arranged in staggered pairs about the tire, one loop of a pair being close to the walls of the groove and the other loop of the pair being spaced axially from the first loop. Thus, the lengths of wire elements D have inner loops 46 that mount elements in the mold which have the generally radial legs 47 and the bent apices 48 that may be constructed in accordance with the principles previously explained. The outer loops, that is those nearest the center of the ribs, indicated generally at 56, have radial legs 57 and apices 58 which in this case need not be bent but are preferably radial. As best seen in Fig. 13, short connecting portions 59 join one leg of each pair of loops and longer connectors 60 bridge the tire grooves, these connecting the outer loop 56 of one pair with the inner loop 46 of an opposite pair. As seen in Fig. 15, the apices 48 of the inner loops 46 snap into notches 63 formed in the rib 22 of the tire mold. In this form additional traction boosting is obtained because of the presence of the outer loops in addition to the inner loops.

Figure 16:
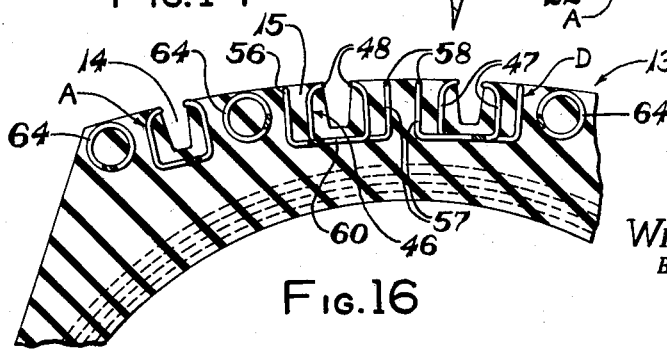
Fig. 16 shows them in the tire tread.

It is sometimes found desirable to incorporate spiral springs or zigzag continuous wire elements 64 in the center portion of the ribs. These are nested in the grooves of the mold that will eventually form tire ribs. Since the mold is split as at 21, the wire element intended for the central rib at the slit may become pinched when the mold is closed causing difficulty in curing the tire. As seen in Fig. 16, a pair of the wire elements D just described make it unnecessary to add the additional elements 64 in the central rib if such additional type of traction boosting is desired because of the proximity of loops 58 at the central rib.

As shown in Figs. 15 and 16, the multiple elements D may be applied only at the mid ribs of the tire and elements like A and B, or like A, B, or C may be applied at the other ribs, and other type of elements such as spirals 64 may be applied at the remaining ribs. It is to be understood that the elements 64 themselves form no part of this invention. Of course, elements D may be employed for all the ribs, if desired.

It will also be obvious that the advantages of interchangeability in various tire mold sizes described in connection with the element C of Figs. 9–12 may be incorporated in the form of Figs. 13–16 if desired in that elements D may be made radially shorter than the deepest tire mold encountered in a given line of tires, and no longer than the shallowest tire mold.

The elements A to D are best made of a strong spring steel wire. They can be formed automatically on wire bending machines well-known in the art. They can be applied in the mold either at the original cure or during a retreading operation.

Having completed a detailed description of my invention so that those skilled in the art may practice the same, I claim:

1. A pneumatic tire comprising a carcass of strain resisting elements, and a rubber tread, said rubber tread having a plurality of generally circumferentially extending ribs separated by generally circumferentially extending grooves, and combined crack resistant and traction members in said tread for at least some of the ribs and grooves thereof, said members each comprising a separate generally sinuous length of wire extending generally circumferentially of said tread with generally radial portions disposed in the adjacent sides of the ribs on either side of an intervening groove and connecting portions extending laterally in the tread beneath the intervening groove.

2. A pneumatic tire comprising a carcass of strain resisting elements, and a rubber tread, said rubber tread having a plurality of generally circumferentially extending ribs separated by generally circumferentially extending grooves, and combined crack resistant and traction members in said tread for at least some of the ribs and grooves thereof, said members each comprising a separate generally sinuous length of wire having circumferentially staggered generally radially extending loop portions disposed in the adjacent sides of the ribs on either side of an intervening groove with other wire portions connecting said loops and including lengths of wire extending in the tread beneath the base of said intervening groove.

3. A pneumatic tire comprising a carcass of strain resisting elements, and a rubber tread, said rubber tread having a plurality of generally circumferentially extending ribs separated by generally circumferentially extending grooves, and combined crack resistant and traction members in said tread for at least some of the ribs and grooves thereof, said members each comprising a separate generally sinuous length of wire having circumferentially staggered generally radially extending loops disposed in the adjacent sides of the ribs on either side of an intervening groove, integral portions of the member connecting said loops and including lengths of wire extending in the tread beneath the base of said intervening groove, said loops being axially spaced from the sides of the ribs in which they are disposed, the apices of said loops having an axial extent to terminate at the sides of said intervening groove so that said apices of a member engage the opposite sides of a projection of the tire mold which forms the groove between adjacent tread ribs during molding of the tire.

4. A pneumatic tire comprising a carcass of strain resisting elements, and a rubber tread, said rubber tread having a plurality of generally circumferentially extending ribs separated by generally circumferentially extending grooves, and combined crack resistant and traction members in said tread, said members each comprising a generally sinuous length of wire having circumferentially staggered generally radially extending loops disposed in the adjacent sides of the ribs on either side of an intervening groove, integral portions of the member connecting said loops and including lengths of wire extending in the tread beneath the base of said intervening groove, said loops being axially spaced from the sides of said ribs, the apices of said loops having an axial extent such that they extend slightly into the sides of said intervening groove so that said apices can slip into notches formed in a projection of the tire mold that forms the said intervening groove during molding of the tire.

5. A pneumatic tire comprising a carcass of strain resisting elements, and a rubber tread, said rubber tread having a plurality of generally circumferentially extending ribs separated by generally circumferentially extending grooves, and combined crack resistant and traction members in said tread, said members each comprising a generally sinuous length of wire having circumferentially staggered generally radially extending loop portions, said staggered loop portions being arranged in axially spaced pairs disposed in the adjacent sides of the ribs on either side of an intervening groove, integral portions of a member connecting one leg of each pair of loops thereof, and other integral portions connecting the other legs of the loops of a member and extending in the tread beneath the base of the intervening groove.

6. A pneumatic tire comprising a carcass of strain resisting elements, and a rubber tread, said rubber tread having a plurality of generally circumferentially extending ribs separated by generally circumferentially extending grooves, and combined crack resistant and traction members in said tread, said members each comprising a generally sinuous length of wire having circumferentially staggered generally radially extending pairs of axially spaced loops disposed in the adjacent sides of the ribs on either side of an intervening groove, integral portions of a member connecting one leg of each of said paired loops, other integral portions of the member extending in the tread beneath the base of said intervening groove and connecting said paired loops, the paired loops being axially spaced from the sides of said ribs and from one another, and the apices of said loops nearest the intervening groove having an axial extent to terminate at the sides of said intervening groove so that said apices can slip into notches formed in a projection of the tire mold that forms the said intervening groove during molding of the tire.

7. A pneumatic tire comprising a carcass of strain resisting elements, and a rubber tread, said rubber tread having a plurality of generally circumferentially extending ribs separated by generally circumferentially extending grooves, and combined crack resistant and traction members in said tread, said members each comprising a generally sinuous length of wire extending generally circumferentially of said tread with generally radial loop portions disposed in the ribs on either side of an intervening groove adjacent the facing sides of those ribs, the apices of said loop portions having an axial extent that bring them at least to the said facing sides of the ribs on either side of an intervening groove in a zone radially inwardly of the periphery of said ribs, and loop connecting portions extending laterally in the tread beneath the said intervening groove.

References Cited in the file of this patent
UNITED STATES PATENTS

| | | |
|---|---|---|
| 2,513,064 | Solomon et al. | June 27, 1950 |
| 2,557,945 | Crooker | June 26, 1951 |
| 2,600,506 | Kimes | June 17, 1952 |
| 2,756,799 | Pfeiffer | July 31, 1956 |

UNITED STATES PATENT OFFICE

CERTIFICATE OF CORRECTION

October 27, 1959

Patent No. 2,910,104

William F. Billingsley

It is hereby certified that error appears in the printed specification of the above numbered patent requiring correction and that the said Letters Patent should read as corrected below.

Column 1, line 68, for "tire mold" read -- tire tread --.

Signed and sealed this 26th day of April 1960.

(SEAL)
Attest:
KARL H. AXLINE
Attesting Officer

ROBERT C. WATSON
Commissioner of Patents